United States Patent [19]

Ito

[11] Patent Number: 5,283,730
[45] Date of Patent: Feb. 1, 1994

[54] SYSTEM FOR AUTOMATICALLY INCREASING PROGRAM EXECUTION SPEED

[75] Inventor: Hiroshi Ito, Tokyo, Japan
[73] Assignee: Nec Corporation, Tokyo, Japan
[21] Appl. No.: 841,078
[22] Filed: Feb. 25, 1992
[51] Int. Cl.$^5$ ............... G06F 15/20; G06F 15/38
[52] U.S. Cl. .................. 364/400; 364/419.01
[58] Field of Search ...................... 364/400, 404

Primary Examiner—Roy N. Envall, Jr.
Assistant Examiner—Khai Tran
Attorney, Agent, or Firm—Foley & Lardner

[57] ABSTRACT

Based on dynamic characteristics as a FORTRAN program is run, which are obtained by using a tool for collecting program running characteristics for computer hardware having a vector processing architecture, a subroutine selecting unit compares previously entered target values with its actual computing performance for an execution frequency, CPU execution time, an execution cost ratio and a vectoring ratio of each subroutine invoked as the entire program is run once, and extracts any subroutine which does not reach the target value as one to be revised while, at the performance information collecting unit, any non-vectored DO loop is detected from among the subroutines to be revised, and subsequently, it is determined whether vectoring directives may be issued or not or whether it is possible to vector the loop or not. A source program revising means revises its coding to make it possible to automatically carry out speedy revising operations issuing for the vectoring directives.

7 Claims, 9 Drawing Sheets

F1: COMPUTING INPUT DATA FILE
F2: FORTRAN SOURCE PROGRAM SOURCE UNIT LIBRARY
F3: INCREASED SPEED CONDITION DATA FILE
F4: FILE FOR STORING INTERMEDIATE EXECUTION RESULT
F5: FILE FOR STORING RUNNING RESULT FOR A TOOL FOR COLLECTING PROGRAM RUNNING CHARACTERISTICS
F6: FILE FOR STORING INFORMATION FOR EXTRACTING SUBROUTINE
F7: FILE FOR STORING INFORMATION FOR REVISING SUBROUTINE
F8: FILE FOR STORING REVISED INFORMATION FOR BEING OUTPUT
F9: REVISING WORKING FILE

IJK = IL(I)

WK(IJK) = A(IJK) + B(IJK) + C(I) * D(IJK)

CALL FCT (WK(I), A(I))

20 CONTINUE

FUNCTION FCT (X,Y)

X = Y + Y * Y

RETURN

END
```

FIG.4

| REVISED CONTENT | DEVELOPING OF SUB-ROUTINE WITHIN DO LOOP | COMPULSORILY VECTORING INSTRUCTION |
|---|---|---|
| CONDITION | 1. DO LOOP IS NOT VECTORED.<br><br>2. THE LOOP DOES NOT INCLUDE READ, WRITE, IF AND GO TO STATEMENTS.<br><br>3. THE LOOP INCLUDES CALL STATEMENT.<br><br>4. THE SUBROUTINE INVOKED BY CALL STATEMENT INCLUDE NO READ, WRITE, IF, GO TO AND CALL STATEMENTS. | 1. DO LOOP IS NOT VECTORED.<br><br>2. THE LOOP DOES NOT INCLUDE READ, WRITE, IF, GO TO AND CALL STATEMENTS.<br><br>3. OPERATES ARRAYS<br><br>4. AMONG THE ARRAYS EMERGING DURING OPERATING THE ARRAY, THERE ARE ONES WHICH SUBSCRIPT IS INVOKED FROM THE ARRAY. |

FIG. 5

```
1........(RECORD 1)
5........(RECORD 2)
80.......(RECORD 3)
1000.....(RECORD 4)
800......(RECORD 5)
```

(RECORD 1) NUMBER OF AUTOMATIC RERUNNING AFTER THE SOURCE PROGRAM IS REVISED

(RECORD 2) STANDARD VALUE OF EXECUTION COST RATIO (%)

(RECORD 3) STANDARD VALUE OF THE VECTORIZATION RATIO OF THE SUBROUTINE (%)

(RECORD 4) STANDARD VALUE (NUMBER OF TIMES) OF THE EXECUTION FREQUENCY OF THE SUBROUTINE (RECORD 5) STANDARD VALUE (m sec) OF THE EXECUTION CPU TIME

```
SUBROUTINE DEF           DYNAMIC CHARACTERISTIC OF THE
                         SUBROUTINE DEF
    ⟨
    ⟩
DO 100 I = 1, 20000      (EXECUTION COST RATIO) ____ 10 %
    ⟨
    ⟩
100 CONTINUE             (VECTORIZATION RATIO) ______ 5 %
                         (EXECUTION FREQUENCY)...10000TIMES
    ⟨
    ⟩                    (EXECUTION CPU TIME)....15000 msec
END
```

NON-VECTORED DO LOOP

```
DO 100 I = 1, 20000
A(I) = B(I) * A(I) + C(I)
CALL SUB (WK(I), A(I))

100 CONTINUE
```

SUBROUTINE INVOKED FROM THE DO LOOP OF NUMBER 100

```
SUBROUTINE SUB (X,Y)
    X = X + Y + Y * Y
RETURN
END
```

BEFORE REVISING

```
*VDIR  NODEP(WK)
    DO 10  I = 1, 10000
        IJ = IL(I)
        WK(IJ)= WK(IJ)+ A(I) * WK(IJ) + C(I) * WK(IJ)
10  CONTINUE
```

AFTER REVISING

FIG. 9

```
DO 100  I = 1, 20000
    A(I) = B(I) * A(I) + C(I)
    CALL SUB (WK(I), A(I))
100 CONTINUE
```

```
    SUBROUTINE  SUB (X,Y)
        X = X + Y + Y * Y
RETURN
END
```
BEFORE REVISING

```
DO 100  I = 1, 20000
    A(I) = B(I) * A(I) + C(I)
    WK(I) = WK(I) + A(I) + A(I) * A(I)
100 CONTINUE
    DO 100  I = 1, 20000
    A(I) = B(I) * A(I) + C(I)
    CALL SUB (WK(I), A(I))
100 CONTINUE
```
AFTER REVISING

FIG. 10

--- ABC ---

|  | EXECUTION FREQUENCY | EXECUTION CPU TIME (m sec) | EXECUTION COST RATIO (%) | VECTORIZATION RATIO |
|---|---|---|---|---|
| BEFORE REV. | 25000 | 30000 | 20 | 10 |
| AFTER REV. | 25000 | 250 | 2 | 99.1 |

REVISED CONTENT OF THE PROGRAM

| REVISED CONTENT | DO LOOP NO. | INDICATED ARRAY |
|---|---|---|
| VECTORIZING DIRECTIVES | 10 | WK |

/ # SYSTEM FOR AUTOMATICALLY INCREASING PROGRAM EXECUTION SPEED

FIELD OF THE INVENTION

The present invention relates to a system for automatically increasing the execution speed of a FORTRAN program, which is used to calculate numerical values, using computer hardware having vector processing architecture and an operating system having a tool for collecting program running characteristics.

BACKGROUND OF THE INVENTION

Conventionally, since extensive calculations are to be executed for numerical computations in the field of science and technology, efficient performance of the same is required. To this end, in general, it is necessary to revise a source program dedicated to a high speed machine environment necessary. Especially when execution is carried out by computer hardware equipped with vector processing architecture and by vector operating DO loops which require a high computing overhead, high speed processing is necessary to allow efficient execution to be achieved. When such vector processing is carried out, a compiler may generate an object program by optimizing the source program so that the vector processing may become possible. However, conventionally, for the program which cannot be optimized by the compiler, it has been necessary to edit and output static information regarding program characteristics, such as a referencing relationship between subroutines or a condition in which variables are referenced, or the like, and dynamic characteristics (number of referencing times and running time per unit of program, running time of each subprogram statement, or the like) by utilizing a tool for collecting program running characteristics, which is available in the operating system, so as to revise them into a coding system which may be optimized by the compiler.

Figure 1:
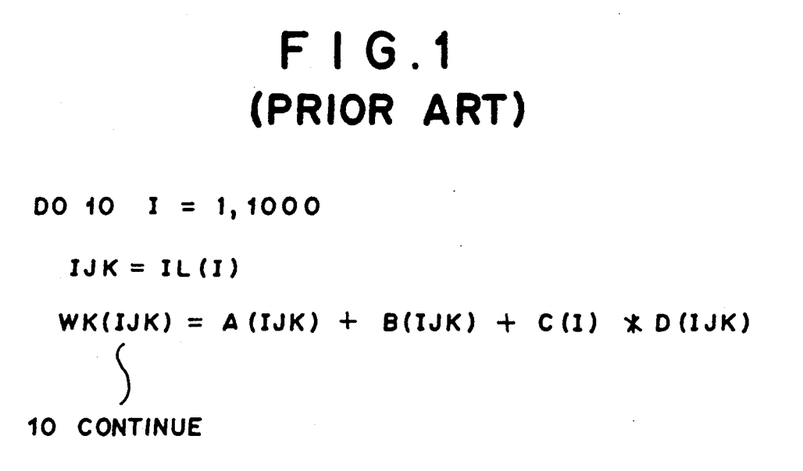
FIG. 1 is a diagram illustrating an example in which the DO loop cannot be vectored by the conventional compiler.

FIG. 1 is a diagram illustrating a specific example in which a conventional complier cannot vector the DO loop and, for example, if, as shown in FIG. 1, an array subscript IJK for arrays WK, A, B and C in an arithmetic operating means is invoked by using a list vector IL, then the compiler cannot optimize vector processing because, after it interprets the statement, it cannot determine whether the definition referencing relationships are matched or not.

Figure 2:
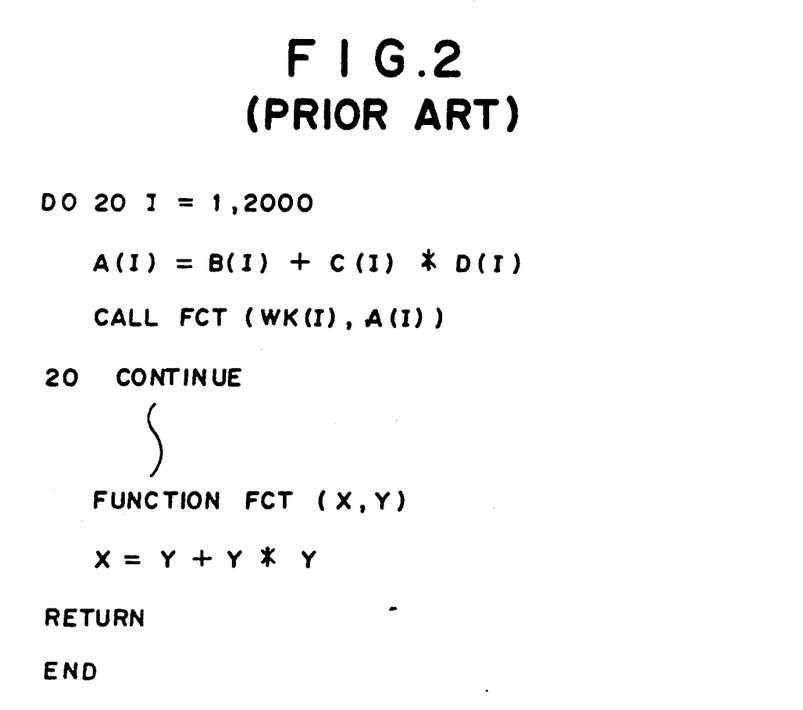
FIG. 2 is a diagram illustrating a conventional example in which the DO loop cannot be vectored because there is a CALL statement within the loop.

Further, FIG. 2 is a diagram illustrating a conventional example in which the compiler cannot vector the DO loop because there is a CALL statement within the loop and, even when the CALL statement is present within the DO loop, as shown in FIG. 2, the compiler cannot optimize vector processing for that DO loop.

In such conditions as in FIGS. 1 and 2, when a programmer revises the coding by using the tool for collecting the program running characteristics, which is available in the operating system, he looks for the points of the source program considered possible for the compiler to optimize for vectoring, and manually revises them. As a consequence, a great number of man days are necessary in order to make the DO loop perform vector processing to increase program execution speed.

SUMMARY OF THE INVENTION

Accordingly, an object of the present invention is to eliminate such a drawback as above and provide a system for automatically increasing program execution speed which allows the DO loop, which has not been vectored by the conventional compiler, to be automatically revised so that the compiler can carry out high speed vector processing.

According to the present invention, in connection with the running and revising of the FORTRAN source program DO loop, which is for numerical computation, there is provided a system available for computer hardware having a vector processing architecture and an operating system having a tool for collecting program running characteristics comprisingly increased speed condition input means for entering parameters such as execution CPU frequency, an execution time, a vectorization ratio and the like, each of which serve as a measure for extracting any subroutine to be revised, a data input means for entering computing data necessary to run the FORTRAN source program, a program executing means for running the FORTRAN program by the above-described tool, based on the entered data, to collect the frequency of program running characteristics, a subroutine selecting means for selecting any subroutine to be revised for the information emitted by the tool, such as the CPU execution frequency, the execution time, and the vectorization ratio for each subroutine, based on the parameters entered at the increased speed condition input means, performance information collecting means for collecting the information as to the presence of any DO loop, vectoring of the DO loop, absence of READ, WRITE, IF and GO TO statements within any non-vectored DO loop, possibility of vectoring according to vectoring directives and possibility of vectoring by developing the subroutine within the DO loop in that order for each subroutine selected and determined as a possibility for revision by the subroutine selecting means to determine whether a more efficient operating process for the DO loop is possible or not so that, if the answer is yes, the content needing revision is indicated, a source program revising means for issuing vectoring directives to the DO loop within the source program based on the instruction from the performance information collecting means, or developing an external function invoked within the DO loop while, if, as a result of rerunning after revision, it is determined by the subroutine selecting means that the running speed is not improved, then editing the process of analysis and revision of the program to revise the source program to an original state as it used to be, a source output means for overwriting the subroutine of a working file revised by the source program revising means onto the original source program to emit to a SYSOUT, a revising process information editing means for editing the detailed information regarding the running process and the running characteristics before and after the revision of the subroutine, which has passed through the subroutine selecting means, performance information collecting means and the source program revising means and a revising process information output means for emitting the detailed information regarding the running process and the running characteristics of each subroutine edited by the revising process information editing means. Based on the information obtained by computing using the tool, the subroutine selecting means compares the target values previously entered at the increased speed condition input means with the actual computing performance for the execution frequency, the CPU execution time, the execution cost ratio of each subroutine invoked during a single time of running of the entire program to extract any subroutine which does not attain the target values as one to be revised while the performance information collecting means detects any non-vectored DO loop from among the subroutines to be revised and, subsequently, detects a definition referencing relationship between the array variables within a loop to determine that it is possible to vector the loop by the vectoring derivatives or developing the subroutine within the loop so that, based on its determination, the source program revising means may revise the coding. In consequence, it becomes possible to automatically increase the speed of the revising work of the DO loop, which is necessary for vectoring and yet has not been able to be vectored according to conventional compilers, and emit its revising process information to thereby greatly reduce the number of man-days.

BRIEF DESCRIPTION OF THE DRAWINGS

The present invention will be hereinafter described in greater detail with specific reference to accompanying drawings in which.

DETAILED DESCRIPTION OF THE PREFERRED EMBODIMENT

Figure 3:
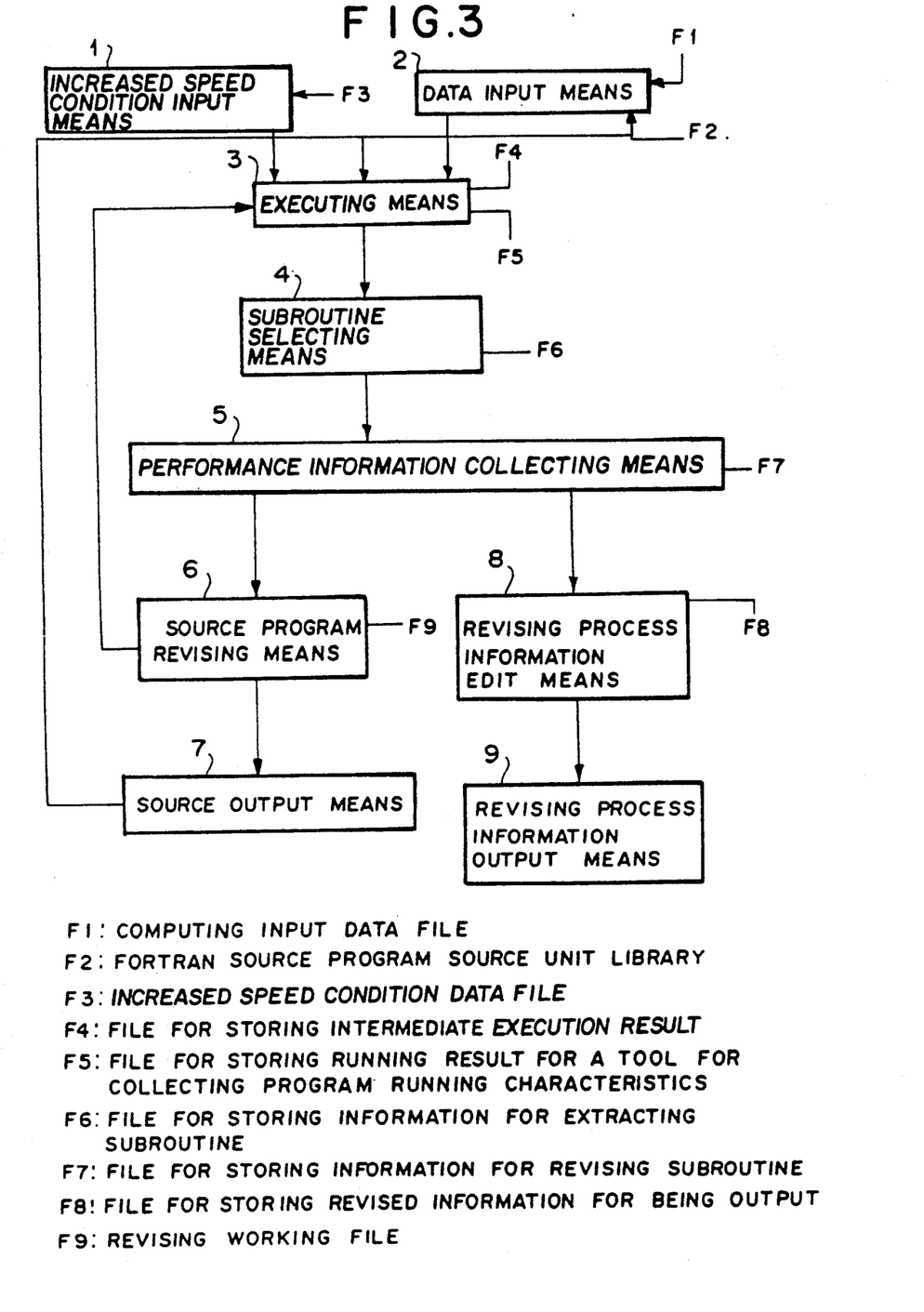
FIG. 3 is a block diagram illustrating how a system for automatically increasing the speed of running of a program is arranged.

FIG. 3 is a block diagram illustrating how an embodiment according to the present invention is arranged, and the embodiment comprises a increased speed condition input means 1, a data input means 2, a program executing means 3, a subroutine selecting means 4, a performance information collecting means 5, a source program revising means 6, a means 8 for editing information regarding the revising process, a source output means 7 and a means 9 for outputting information regarding the revising process.

On the other hand, as working files, as shown in FIG. 3, the following is available.

F1: a file for storing computing input data necessary to execute the FORTRAN program.

F2: a source unit library for a FORTRAN source program for execution.

F3: a file to which an increased speed condition is entered.

F4: a file in which an intermediate execution result is stored in order to alternately carry out an analysis and revision of the source program by repeating interruption of the execution when a large-scale analyzing execution is conducted at program execution means 3.

F5: a file for storing the program running result of the tool for collecting the program running characteristics at the program executing means 3.

F6: a file for storing the information regarding the process and result of extracting a revised subroutine based on the comparison of the detailed information regarding running characteristics with the increased speed determining condition at the subroutine selecting means 4.

F7: a file for storing any information regarding a specific revised content obtained when, at the performance information collecting means 5, a DO loop which can be vectored by being revised is detected among already extracted subroutines to be revised.

F8: a file for storing the information resulting from the process and result of the revision and determination (revised points, decision of the measures to be taken and the measures taken after rerunning of the program) at the revising process information editing means 8 after edited.

F9: a working file for writing and revising a subroutine including a DO loop already determined as possible to be vectored at the source program revising means 6 after revised.

First, at the increased speed condition input means 1, the increased speed condition data file F3 is entered, and any subroutine which satisfies all of the conditions for the following parameters B though E is extracted as the object to be revised.

A. number of times it is automatically run after the program is revised.

B. execution cost ratio of the subroutine

C. vectorizing ratio

D. execution frequency

E. CPU execution time

At the data input means 2, the computing input data necessary to run the FORTRAN source program is entered from the file F1 while, at the same time, the source program is entered from the file F2.

At the program executing means 3, based on the computing input data entered at the data input means 2, the FORTRAN source program is run by using the tool for collecting the program running characteristics, and the program running characteristics are collected to be written onto the file F5. In addition, if the analysis and the revision are alternately carried out in order to cope with a large-scale analyzing computation, then the intermediate executing result is written in the file F4.

At the subroutine selecting means 4, the increased speed condition entered from the increased speed condition input means 1 and the information regarding the dynamic program running characteristics, which result from the program executing means 3 based on the tool (referencing number and running time per unit of program, running time of each subprogram statement and the like), are collated to extract any subroutine which satisfies the increased speed condition. Its result is written in the file F6.

At the performance information collecting means 5, for each subroutine extracted at the subroutine selecting means 4, the following information is collected in the order of a to f.
a. whether any DO loop is present or not.
b. whether any DO loop is vectored or not.
c. whether READ, WRITE, IF and GO TO statements are present or not for the non-vectored DO loop.
d. whether any CALL statement is present or not.
e. whether it is possible or not to vector in accordance with the instruction to compulsorily vector.
f. whether it is possible or not to vector by developing the subroutine within the DO loop.

If, while the READ, WRITE, IF, GO TO and CALL statements are not present within the loop, any non-vectored DO loop is present, then the definition referencing relationship for the array variables within the loop is examined to check whether the compulsory vectoring can be instructed or not while, if any non-vectored DO loop is present because, although the READ, WRITE, IF, GO TO statements are not present, the CALL statement is present, then, by examining the subroutine being invoked, it is determined whether it is possible or not to vector the DO loop by revising the coding and, if the answer is yes, then the revised content is written in the file F7 to transfer the information regarding the revised content to the source program revising means 6.

Figure 4:
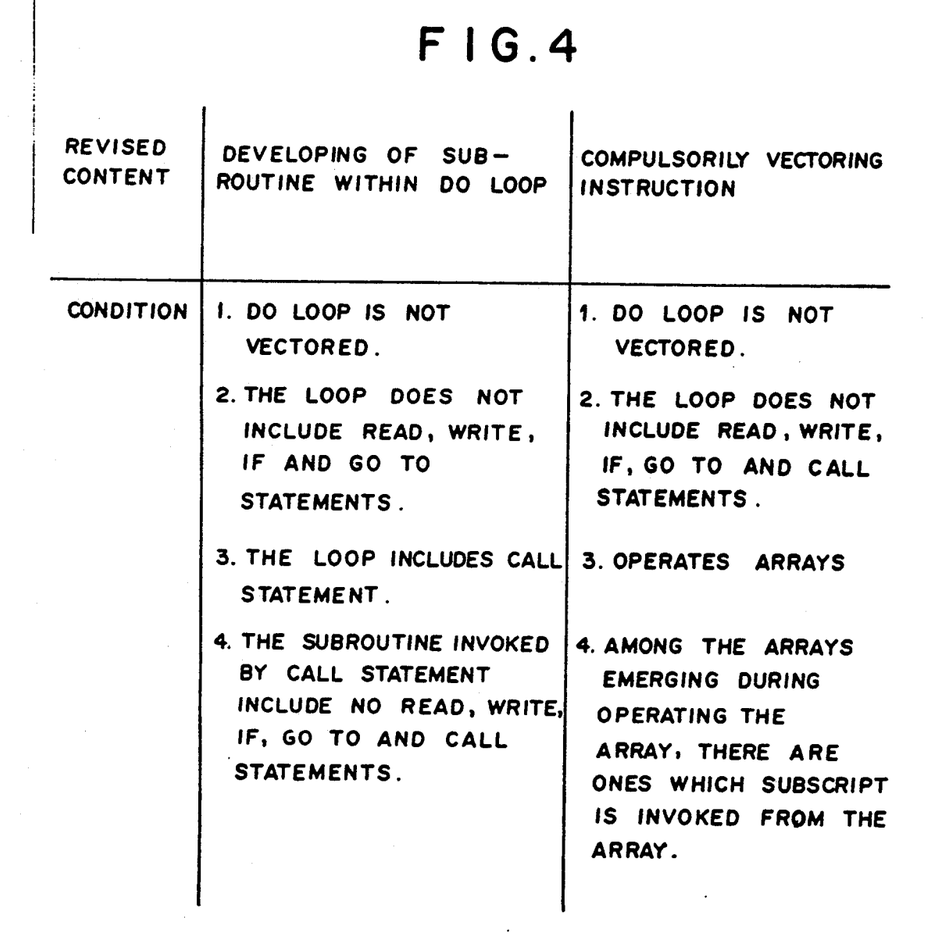
FIG. 4 is a diagram illustrating a condition of a DO loop which is determined a possible to be vectored by revising the coding according to the present invention.

FIG. 4 illustrates a condition of the DO loop which is determined as possible at the performance information collecting means 5 to vector if its coding is revised.

At the source program revising means 6, each of the subroutines to be revised, which are extracted by the subroutine selecting means 4, is written in the working file F9 and, after it is revised based on the information regarding the revised content, which results from the performance information collecting means 5, an original coding portion is left as a comment line to write again in the source program.

Next, in accordance with the times of automatic rerunning of the revised source program, which was entered at the increased speed condition input means 1, the revised program is run. The rerunning result is determined again at the subroutine selecting means 4 and the performance information collecting means 5 and, if the CPU execution time is not necessarily improved, then a further revision is carried out so as to return to the original source program. In addition, in order to confirm the further revision, the existing program portion is left as the comment line.

Figure 10:
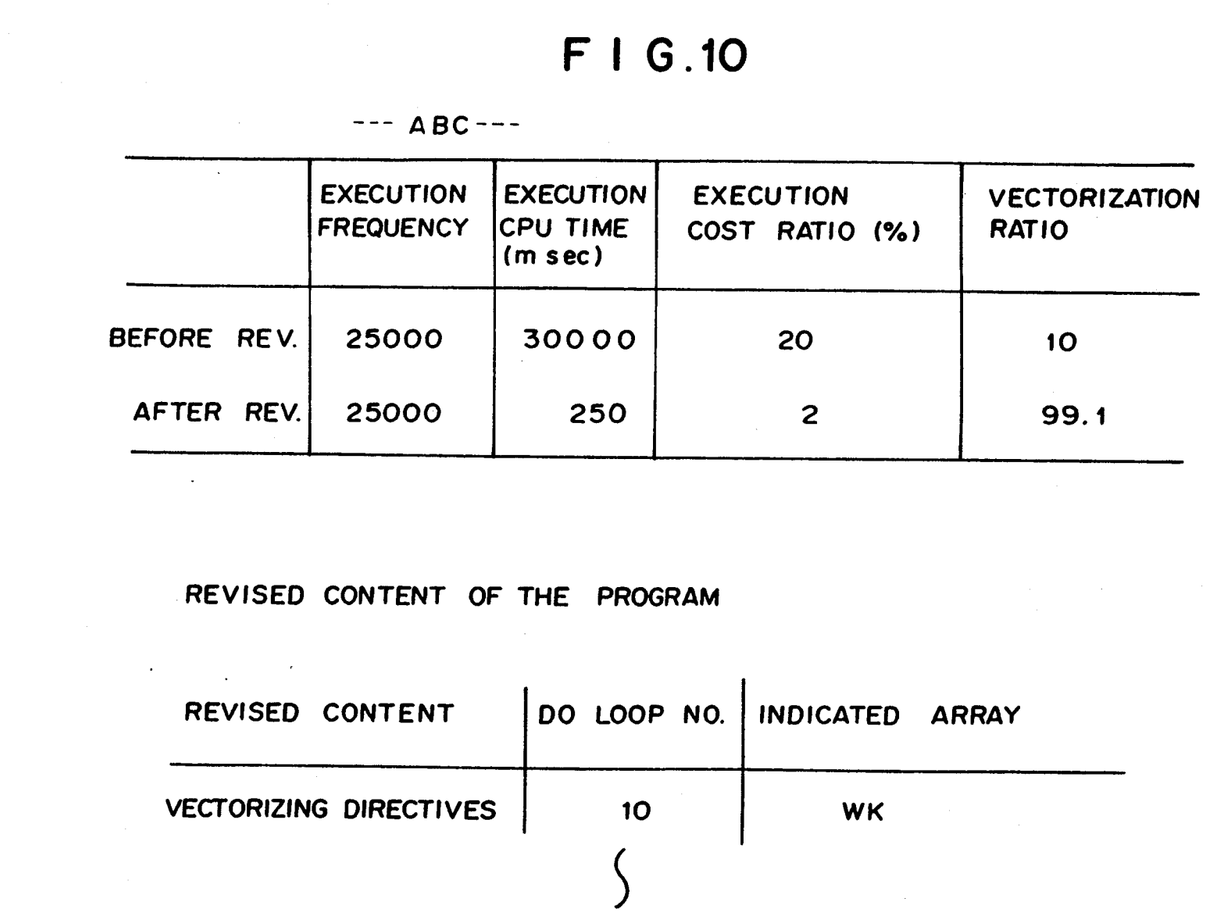
FIG. 10 is a diagram illustrating an example of the output result of an object program according to the present invention.

At the means 8 for editing the information regarding the revising process, the detailed information regarding each subroutine (execution frequency, CPU execution time, execution cost ratio and vectoring ratio), which is obtained until the performance information collecting means 5 is reached, is edited in accordance with a format as illustrated in FIG. 10 to write in the revised information file F8.

At the source output means 7, the content of the revising file F9, in which the revised subroutine is stored, is finally written in the source program source unit library F2 while the revising work of the program is ended.

At the means 9 for emitting the information regarding the revising process, the content of the revised information file F8, in which the information resulting from the means 7 for editing the information regarding the revising process is stored, is written in a SYSOUT.

Figure 5:
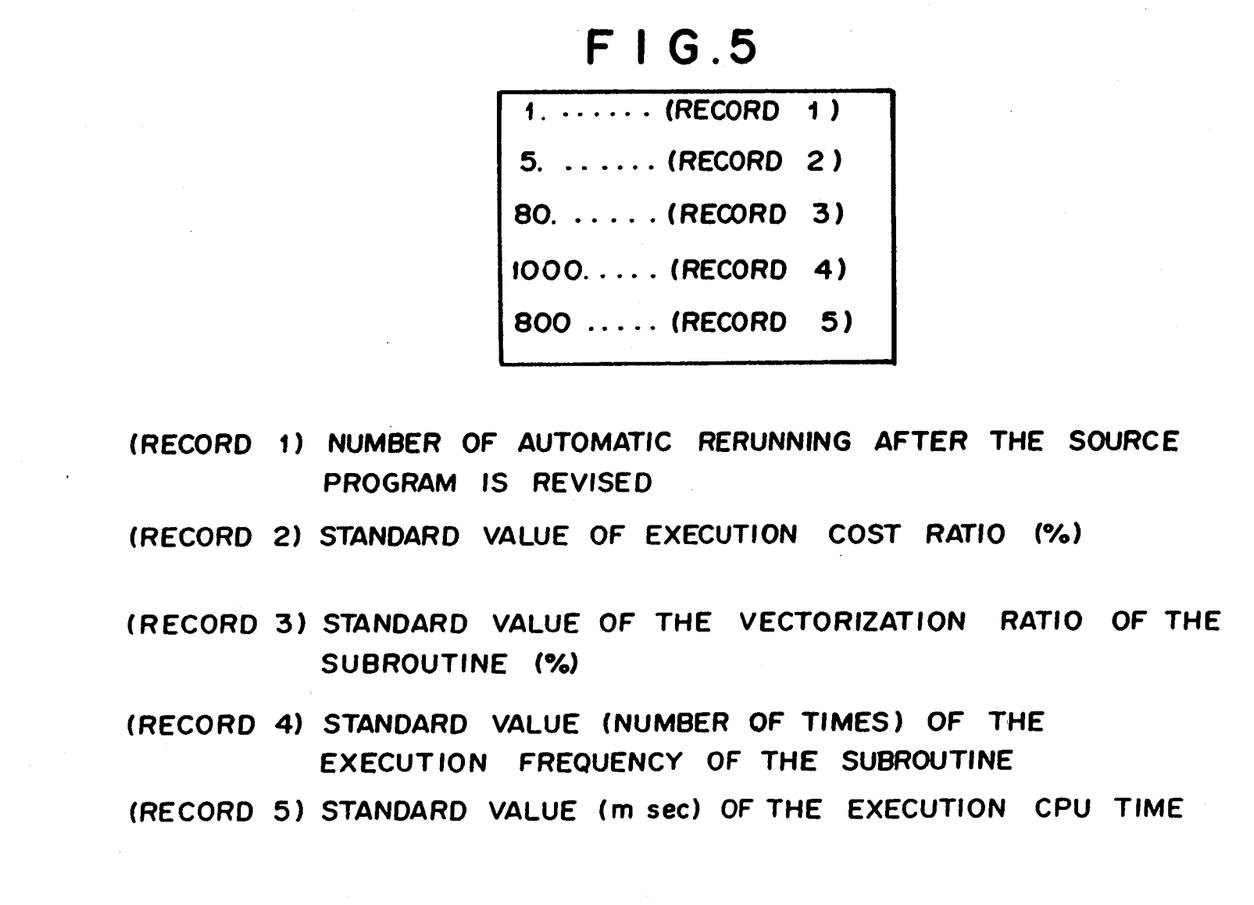
FIG. 5 is a diagram illustrating an example of data entered at an increased speed condition input means according to the present invention.

FIG. 5 illustrates an example of data entered at the increased speed condition input means 1. From the following entered values, any subroutine which satisfies all of the four preset increased speed conditions is extracted.

Execution cost ratio

It shall account for 5 or more % throughout the entire program . . . (record 2) (Vectoring ratio)
It shall be below 80% . . . (record 3)

Execution frequency

The execution frequency during the running of the program shall account for 1,000 or more times . . . (record 4)

CPU Execution time

The CPU execution time shall be 800 msec or more . . . (record 5)
In addition, as shown below, an instruction may be issued to execute again after the program is revised.

Rerunning times of the program after revised

Rerunning is conducted once after the program is revised . . . (record 1)

Figure 6:
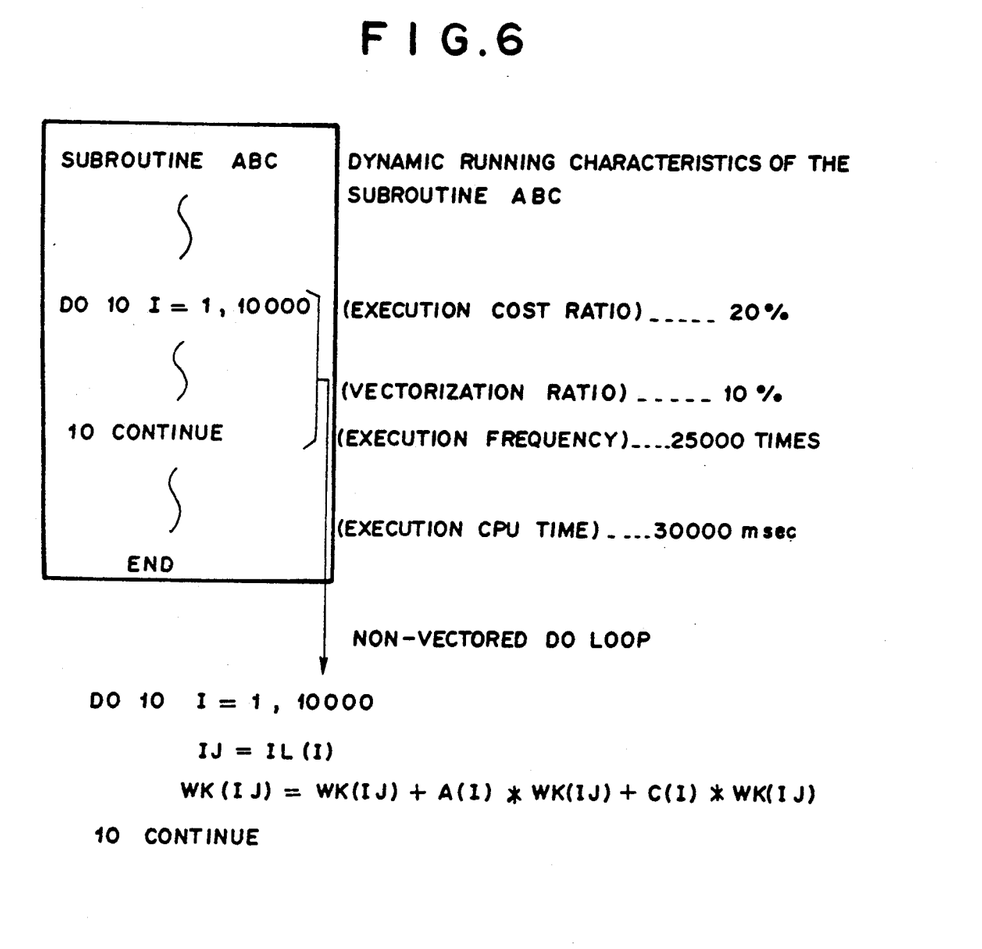
FIG. 6 is a diagram illustrating an example of the DO loop which is determined as possible to be vectored in accordance with vectoring directives according to the present invention.

FIG. 6 illustrates a Do loop and a subroutine including the same among ones extracted at the subroutine selecting means 4, in which although any READ, WRITE, IF, GO TO and CALL statements are not present at the performance information collecting means 5, any non-vectored DO loop is detected and, as a result of retrieving, it is as possible to be vectored according to the vectoring directives as a result of retrieving.

For the subroutine ABC of FIG. 6, when it was run for execution by using the tool for collecting the program running characteristics, the following running characteristics were obtained, and were determined as satisfying all the increased speed conditions at the subroutine selecting means 4.

| (Execution cost ratio) | 20% |
| (Vectoring ratio) | 10% |
| (Execution frequency) | 25000 times |
| (CPU Execution time) | 30000 msec |

At the performance information collecting means 5, when the subroutine ABC was retrieved based on the subroutine selecting means 4, it was found out that the DO loop of number 10 had not been vectored. Next, when the variables IL, WK, A and C referenced within the loop were detected and their array subscripts were detected, the subscript IJ was found to have been defined by the array IL.

Since, in general, the compiler creates an object program optimal for vectoring after the statement of the source program is interpreted, when the subscript IJ is invoked from the array IL, after the statement is interpreted, it cannot be determined whether the definition referencing relationship of the subscript IJ is matched or not. As a result, an optimization cannot be achieved.

Therefore, the performance information collecting means 5 sends the revised information to the source program revising means 6 so as to issue vectoring directives to the array WK.

Figure 7:
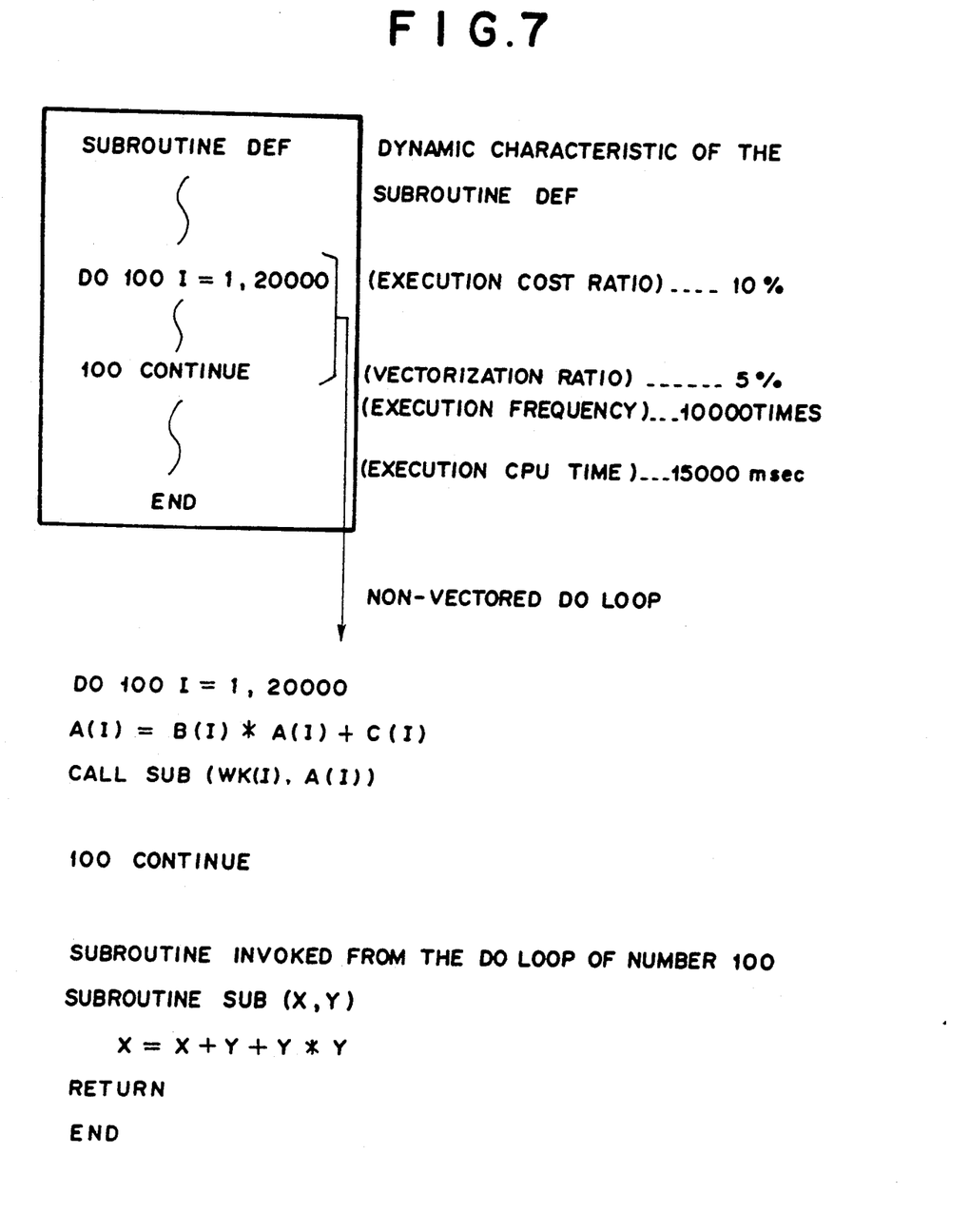
FIG. 7 is a diagram illustrating an example of the DO loop which is determined as possible to vector by developing a subroutine invoked by a CALL statement within the loop according to the present invention within the loop.

FIG. 7 illustrates a DO loop and a subroutine including the same among ones extracted at the subroutine selecting means 4, in which, although any READ, WRITE, IF and GO TO statements are not present at the performance information collecting means 5, because of the presence of the CALL statement, any non-vectored DO loop is detected and determined as possible, as a result of retrieving, to be vectored by developing the subroutine invoked by the CALL statement within the loop.

When the subroutine DEF of FIG. 7 was run for execution by using the program running characteristics collecting tool, the following running characteristics were obtained and determined to satisfy all the increased speed conditions.

| (Execution cost ratio) | 10% |
|---|---|
| (Vectoring ratio) | 5% |
| (Execution frequency) | 10000 times |
| (CPU Execution time) | 15000 msec |

At the performance information collecting means 5, when the subroutine DEF was retrieved based on the determination of the subroutine selecting means 4, it was found that the DO loop of number 100 had not been vectored. Next, when the subroutine SUB invoked within the loop was retrieved, it was found that any READ, WRITE, IF and GO TO and CALL statements were not present.

In general, the compiler cannot vector the DO loop in which the CALL statement is present.

Therefore, the performance information collecting means 5 sends the revised information to the source program revising means 6 so as to develop the subroutine SUB within the loop.

Figure 8:
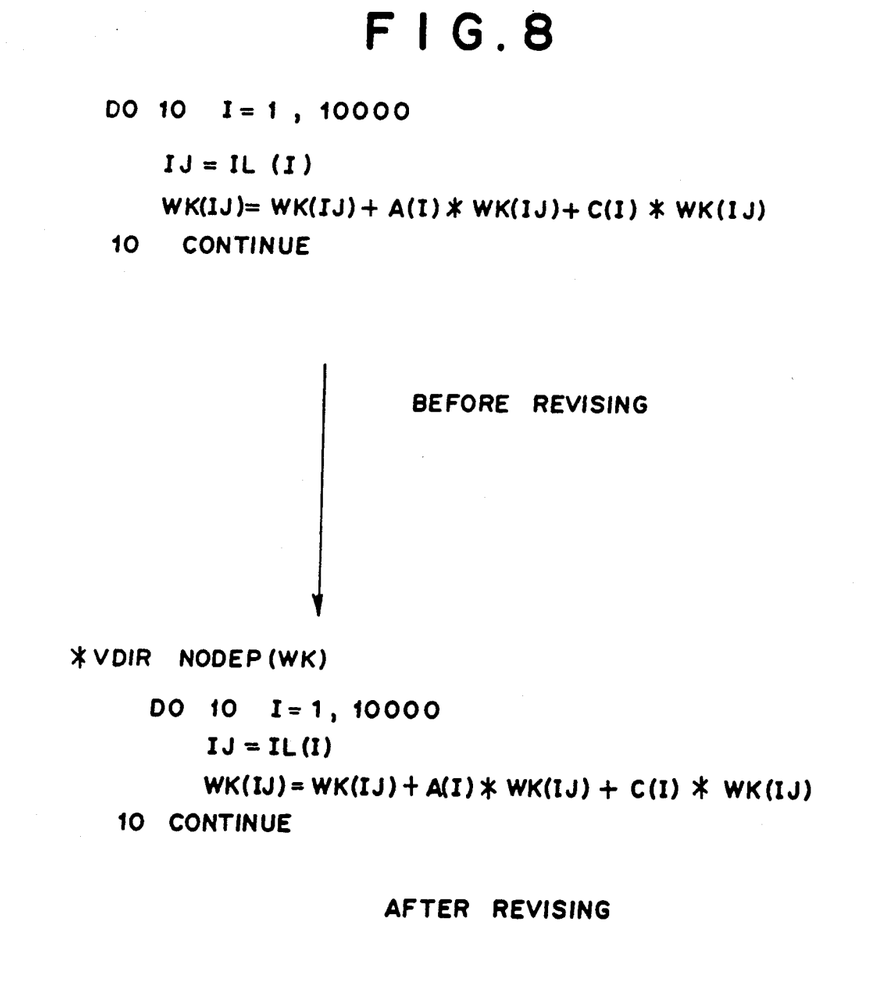
FIG. 8 is a diagram illustrating each coding before and after the DO loop vectored in accordance with an instruction to compulsorily vector is revised according to the present invention.

FIG. 8 illustrates a result obtained by revising the DO loop of number 10 within the subroutine ABC of FIG. 6. In this embodiment, immediately before the DO loop of number 10, a macroinstruction *VDIR NODEP (WK) is inserted to issue vectoring directives on the array WK. In addition, in order to make the revision explicit, a comment line is also inserted.

Figure 9:
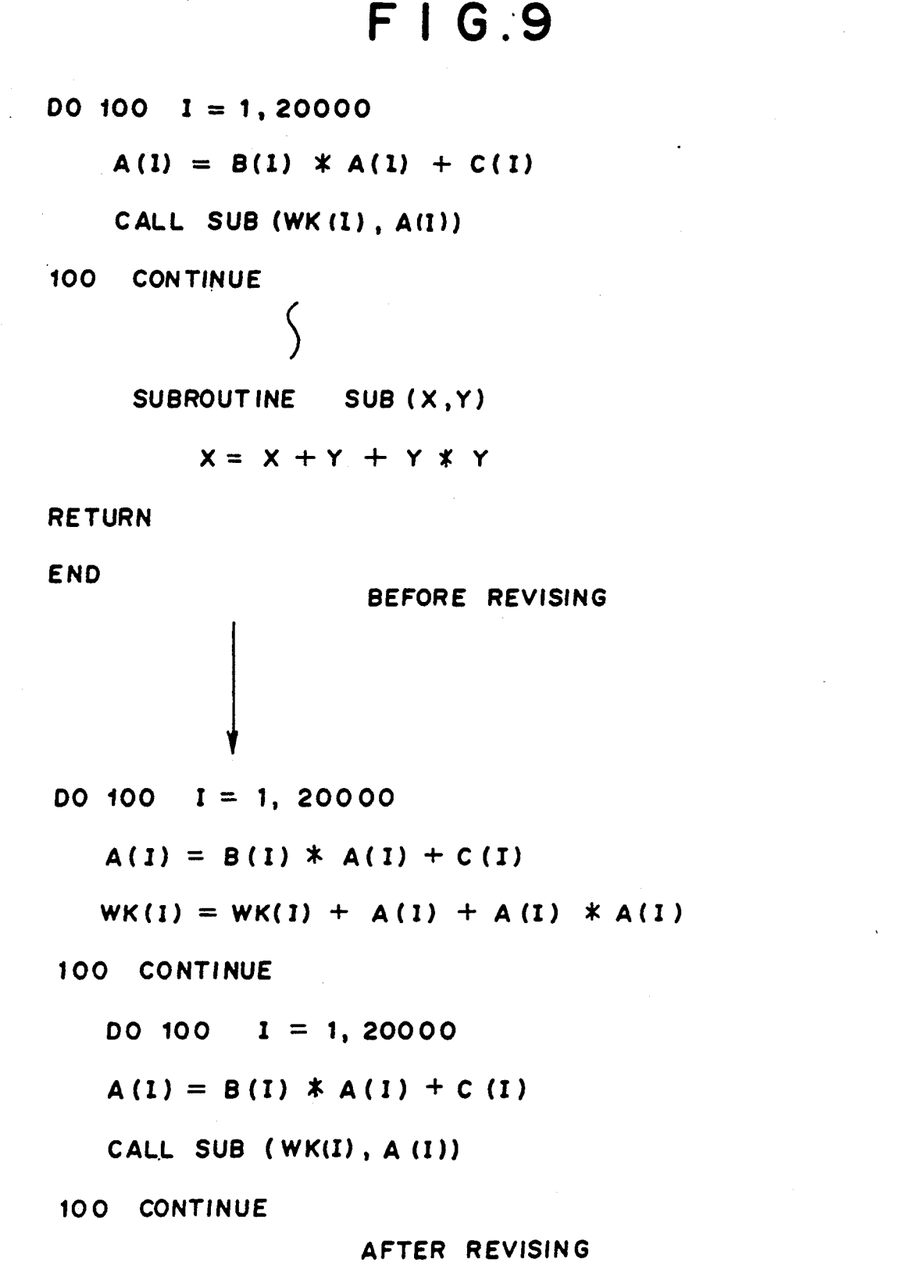
FIG. 9 is a diagram illustrating each coding before and after the DO loop to be vectored is revised by developing the subroutine invoked by the CALL statement according to the present invention within the loop.

FIG. 9 illustrates a result obtained by revising the DO loop of number 100 within the subroutine DEF of FIG. 7. In this embodiment, the subroutine DEF was developed within the loop of number 100. If any declaration statements such as a COMMON statement or a DIMENSION statement or the like is present therein, it must be excluded. In addition, a formal parameter at the side of the subroutine SUB must be developed by revising into a parameter at the side of the subroutine DEF.

In this embodiment, since it is instructed at the increased speed condition input means 1 to carry out the rerunning of the subroutine once after being revised, the subroutine revised in the working file F9 is written in the source program, and a repeated execution is carried out by returning to the program executing means 3.

The revising process information editing means 8 edits the dynamic running characteristics of the source program prior to being revised, the dynamic running characteristics of the source program after being revised and the content revised at the source program revising means 6.

At the revising process information output means 9, the information regarding the running characteristics and the revised content, which was edited at the revising process information editing means 8, is outputted.

FIG. 10 illustrates an example of the output result, in which, for each subroutine, the execution frequency, the vectoring ratio, the CPU execution time and the execution cost ratio are outputted by comparing each other before and after being revised, while the content of the revised source program is made explicit. In this example, for the subroutine ABC, after the program is revised, the CPU execution time is reduced to 1/120 after it is revised in accordance with the vectoring directives while the vectoring ratio is increased from 10% to 99.1% representing a remarkable improvement.

What is claimed is:

1. A system for automatically increasing execution speed of a program on a computer hardware having a vector processing architecture and an operating system having a tool for collecting program running characteristics in running and revising a FORTRAN source program DO loop, which aims at computing numerical values comprising:

increased speed condition input means for entering parameters such as an execution frequency, a CPU execution time, and a vectoring ratio, each of which serves as a measure for extracting subroutines to be revised;

data input means for entering computing input data necessary to run said FORTRAN source program;

means for executing said FORTRAN source program by said tool based on the data entered from said data input means to collect the program running characteristics;

means for selecting subroutines to be revised from among the parameters regarding the execution frequency, the CPU execution time and the vectoring ratio for each subroutine, which is emitted by said tool based on the parameters entered at said increased speed condition input means;

performance information collecting means for collecting the information regarding the presence of DO loops, vectoring of the DO loop, absence of any READ, WRITE, IF, GO TO statements, for any non-vectored DO loop, a possibility of vectoring in accordance with vectoring directives and a possibility of vectoring by being developed within the DO loop of the subroutine in the same order for each subroutine selected and determined necessary to be revised by said subroutine selecting means, to determine whether a more efficient operating process of the DO loop is possible or not so that, if yes, content of said more efficient operating process necessary to be revised is indicated;

source program revising means for issuing vectoring directives to the DO loop within the source program based on said instruction for said performance information collecting means, or for actually revising by developing any external function invoked within the DO loop; and source output means for overwriting said subroutine, which has been revised at said source program revising means, onto an original source program to emit to a SYSOUT.

2. The system of claim 1 wherein, after said source program which has been revised by said source program revising means is run again by said program executing means, if it is determined by said subroutine selecting means that a running speed of said source program is not increased, then the positions of the program in the process of being analyzed and revised and the measures decided to be taken are edited to revise said source program to such an original condition as it used to be.

3. The system of claim 1 comprising a revising process information editing means for editing the detailed information regarding the running process and the running characteristics before and after being revised for said subroutine, which has passed through said subroutine selecting means, said performance information collecting means and said source program revising means and a revising process information output means for emitting to a file and said SYSOUT the detailed information regarding the running process and the running characteristics for each subroutine edited at said revising process information editing means.

4. A system for automatically increasing execution speed of a source program on a computer by revising an operational loop of said source program, comprising:

increased speed parameter input means for inputting increased speed parameters including execution frequency, CPU execution time and a vectoring ratio;

data input means for supplying input data for executing said source program;

program executing means, receiving said input data, for executing said source program by using said input data and for collecting information concerning running characteristics for said source program for each subroutine of said source program, said information including running execution frequency, running CPU execution time and a running vectoring ratio, and for outputting said information;

subroutine selecting means, receiving said information, for selecting a subroutine to be revised from said information on the basis of said increased speed parameters performance information collecting means for collecting performance information including presence of an operational loop, vectoring of said operational loop, absence of READ, WRITE, IF and GO TO statements for a non-vectored operational loop, possibility of vectoring in accordance with vectoring directives and possibility of vectoring by a subroutine developed within said operational loop, said performance information collecting means collecting said performance information in the same order for each said subroutine selected to be revised by said subroutine selecting means, said performance information collecting means determining whether a more efficient process for operating said operational loop is available and said performance information collecting means, when said more efficient process is available, outputting an instruction indicating said more efficient process;

source program means for issuing, based on said instruction, vectoring directives for said operational loop or for producing a revised subroutine by developing an external function for said operational loop; and source output means for overwriting said revised subroutine onto said original source program.

5. The system of claim 4 wherein said program executing means executes said revised subroutine and said subroutine selecting means determines whether a running speed of said revised subroutine is improved relative to a previous running speed of a predecessor subroutine of said revised subroutine and, if not improved, selects said predecessor subroutine.

6. The system of claim 4, further comprising:

revising process information editing means for editing all running information for each revised subroutine to produce edited information; and revising process information output means for outputting said edited information.

7. The system of claim 4, wherein said source program is a FORTRAN source program and said operational loop is a DO loop.

* * * * *

UNITED STATES PATENT AND TRADEMARK OFFICE
CERTIFICATE OF CORRECTION

PATENT NO. : 5,283,730
DATED : February 1, 1994
INVENTOR(S) : Hiroshi ITO

It is certified that error appears in the above-indentified patent and that said Letters Patent is hereby corrected as shown below:

On the title page, Item [30] should read --Foreign Application Priority Data February 28, 1991 [JP] Japan 3-57776--

Signed and Sealed this

Sixteenth Day of August, 1994

*Attest:*

BRUCE LEHMAN

*Attesting Officer*     *Commissioner of Patents and Trademarks*